UNITED STATES PATENT OFFICE.

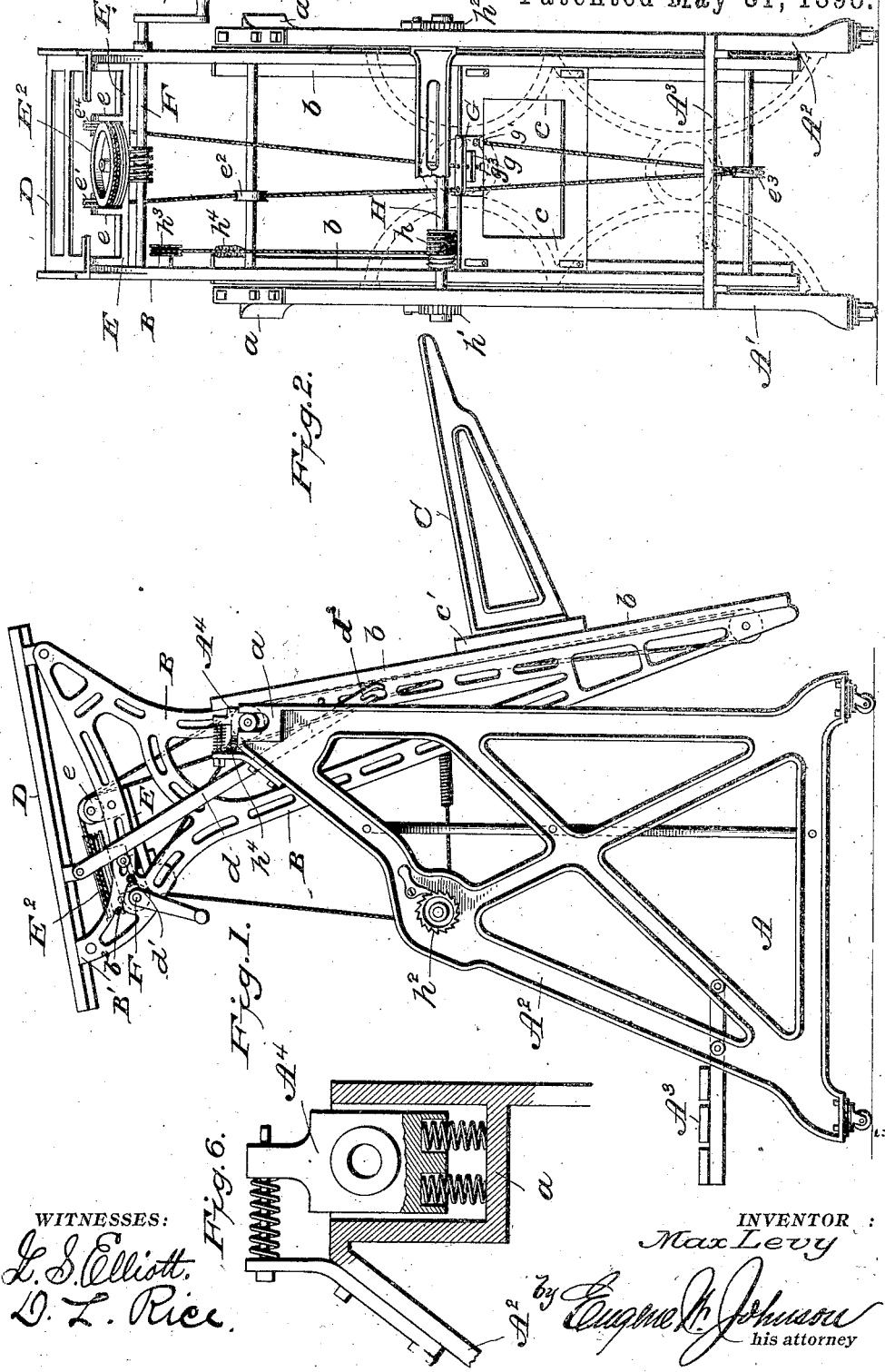

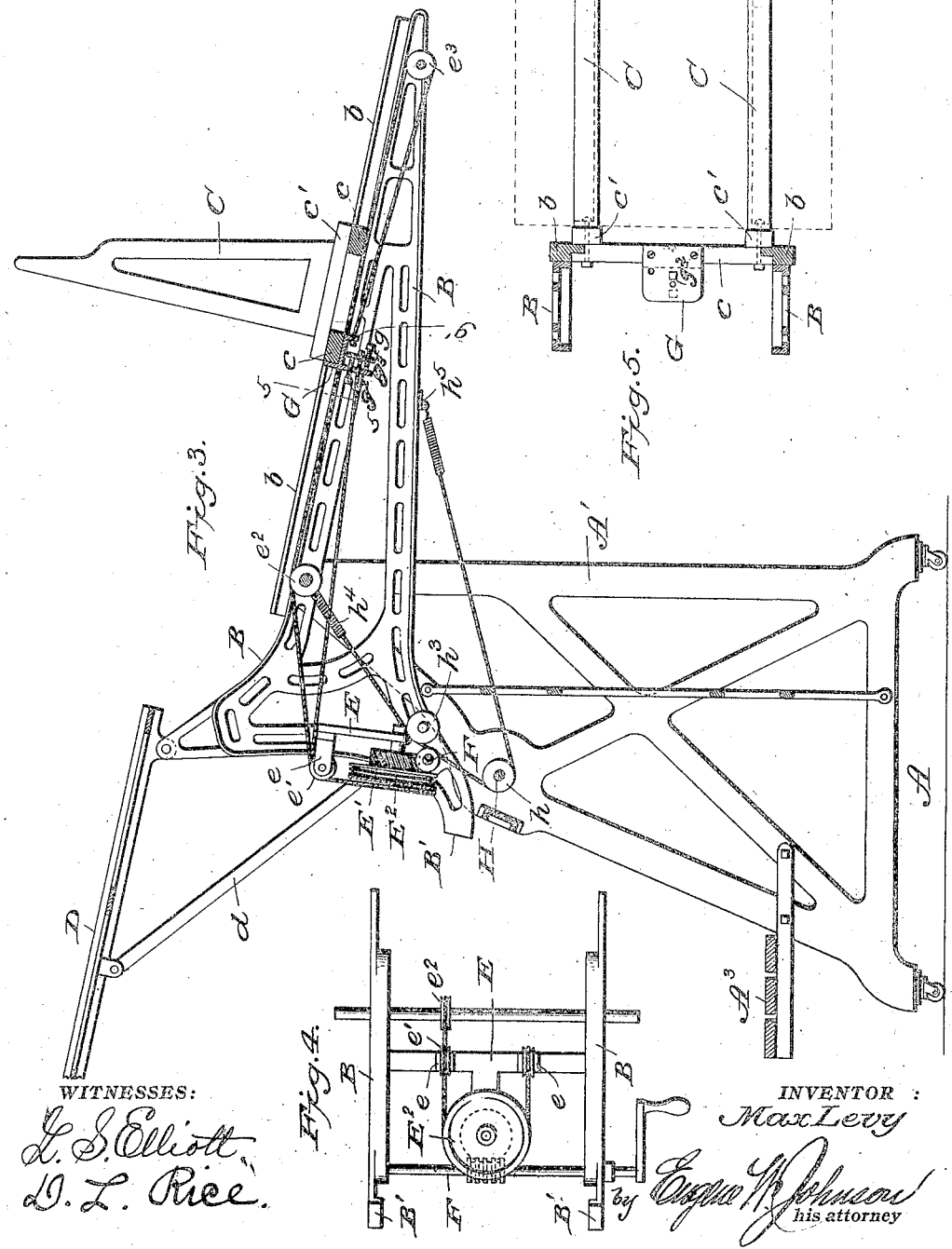

MAX LEVY, OF PHILADELPHIA, PENNSYLVANIA.

PHOTOGRAPHIC-CAMERA STAND.

SPECIFICATION forming part of Letters Patent No. 604,990, dated May 31, 1898.

Application filed July 23, 1897. Serial No. 645,719. (No model.)

*To all whom it may concern:*

Be it known that I, MAX LEVY, a citizen of the United States of America, residing at Philadelphia, in the county of Philadelphia and State of Pennsylvania, have invented certain new and useful Improvements in Camera-Stands; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention appertains to improvements in camera-stands of that class which are used for photographic purposes in copying, the invention being designed to provide a camera and object-support which may be moved in unison, so that they may be maintained in the same relative position with respect to each other notwithstanding that the position of the support may be varied with respect to the base; also, to provide means for connecting the frame by which the camera and object are carried with the base or supporting-frame, so that said parts will be insulated from each other to obviate difficulties incident to vibrations caused by jarring the base or supporting-frame.

A further object of my invention is to generally improve the construction and organization of the parts so as to permit the greatest range of movement and adjustment and to simplify in practice the use of such a stand.

The invention consists in the construction and arrangement of the parts whereby the base and support for the camera and object are mechanically connected so as to be insulated from each other, so as to prevent vibrations which are imparted to the frame from being communicated to the support for the camera and object.

The invention also consists in the novel means for adjusting the movable support with respect to the base.

The invention also consists in the construction and arrangement of the parts, as will be hereinafter fully set forth, and specifically pointed out in the claims.

In the accompanying drawings I have illustrated my invention as applied to a photo-copying apparatus.

Figure 1 is a side elevation showing a camera-platform positioned above the base, and when used in such position the camera will be provided with a hood and prism. Fig. 2 is a rear elevation showing the parts arranged as in Fig. 1. Fig. 3 is a sectional view showing the parts arranged in position for use with a copying-camera of ordinary construction. Fig. 4 is a detail view looking down upon the movable frame when in the position shown in Fig. 1. Fig. 5 is a sectional view taken on the line 5 5 of Fig. 3; and Fig. 6 is a detail view, partly in section, of one of the bearings for the main supporting-shaft which forms a pivotal connection of the camera and object-support with the frame.

In many branches of photo-copying it is customary to make so-called "reverse" negatives, the reversal of the image being brought about by the use of a reflecting prism or mirror in connection with the lens, and under these conditions the body of the camera, from the center of the lens to the center of the ground-glass, must be in a direction at right angles to a line drawn from the center of the lens to the center of the object, whereas if no reversing apparatus is used a line from the center of the object through the lens to the center of the ground glass should be as nearly as possible a continuous straight line. It has been customary in the construction of camera-stands for use in connection with a prism to make these for use in an approximately horizontal position, a condition which entails the loss of valuable space in an operating-room and at the same time sets up conditions of light, vigorous limitations, and renders it very difficult if not impossible to accomplish the desired results without the aid of a skylight.

Where it has been attempted to construct a camera-stand to occupy an essentially vertical position, a difficulty has been encountered to make the camera-stand adjustable to the varying conditions of light at the same time that the camera and object-support are thoroughly insulated from vibrations, whatever position they may occupy with respect to one another and to a supporting-base.

This invention presents, among others, the following advantages: By an instant's adjustment it may be used with a prism for reversing or without a prism. The angle presented by the object to any source of light may be varied to any position between the vertical and horizontal without in any way interfering with the perfection of the insulations against vibrations, and at the same time by reason of the right and left hand pawls and ratchets the angle remains set until changed. The device for governing the distance between the camera and the object-support is extremely smooth, firm, and sensitive, admitting of very slight changes in this distance, great positiveness in the distance once set remaining fixed, and at the same time the possibility of a relatively rapid movement across the entire distance.

The whole stand, designed, constructed, and mounted as it is, is extremely compact and portable and may be readily moved from one position to another in an operating room.

It is desirable in this class of apparatus that the position of the camera and object-support may be varied with respect to the frame, so that the best light may fall upon the object to be copied, and with the device shown a great range of movement can be had, and the object-support is so constructed that an operator in seeking the best light obtainable may even go so far as to move the apparatus so that the object-holder can be projected through a window-opening. The object-holder may also be used with a range of movement extending from a vertical position to a horizontal one.

The base or main supporting-frame A is made up of side pieces A' A², which are connected to each other in any suitable manner, and said side frames at their upper ends have boxes $a$ for the reception of journals for a shaft which serves as a pivotal support for an adjustable frame B, to which the camera-platform and object-holder are secured. The rear portion of the frame is provided with shaft-bearings through which passes a shaft, the ends thereof carrying ratchet-wheels with which engage gravity-pawls pivoted to the side pieces A' A². The base or main supporting-frame may carry a platform A³, and the frame is mounted upon casters, so that the whole apparatus may be moved from place to place as desired.

The whole of the supporting-frame A is designed with due regard to rigidity, lightness, and strength, and the side pieces A' A² are of the steeple type, being substantially vertical on one side and inclined on the other, so as to provide a rigid base which cannot be overbalanced by the adjustable frame B when it is placed in its various positions. The adjustable frame is made up of parallel side pieces, which are connected to each other and are provided with shaft-bearings and fixed shafts, as will be hereinafter referred to, and to the straight edges of the side pieces of the adjustable frame are secured rails $b$, having on their inner side grooves in which slides a rectangular frame $c$, to which is connected blocks $c'$, which carry the object-support C. To the portion of the adjustable frame on the opposite side of the pivotal-support therefor from the object-support is secured a camera-platform D, the camera being connected therewith in any suitable manner, and said platform is adjustable, the same being provided with arms $d\ d$, which engage at one end with side pieces of the frame B, while the other ends thereof are held in pivotal and sliding engagement with the sides of the camera-platform D; means being provided for adjusting the slides and holding them in rigid engagement with the platform D. The free ends of the arms $d\ d$ are provided with notches or recesses $d^2$, which will engage with the pins $b^2$, which project from the side pieces of the frame B, so that the camera-platform may be maintained by said arms in the position shown in Fig. 3 of the drawings. In practice the camera-platform D may be supported in two positions with respect to the frame B or object-support C—that is, it may be parallel therewith, as shown in Fig. 1, or at right angles thereto, as shown in Fig. 3. The adjustment or change of position is manually made, and when the camera-support is not held by the arms $d$ it will rest upon the ends B' of the adjustable frame B, as shown in Fig. 1.

Between the side pieces of the frame which carries the camera-platform D and object-holder C is secured a cross-piece E, from which project pulley-supports $e\ e$, between which are journaled grooved pulleys or rollers, and this cross-piece also carries a bearing in which is journaled a stub-shaft, to which is affixed a wheel E', having teeth for engagement with a worm mounted on a shaft F, said shaft having a suitably-operating crank-handle. The stub-shaft which carries the wheel E' also carries a disk E², provided with a continuous spiral groove, around which passes a flexible connection. One end of said connection is led from the disk over a pulley $e'$, carried by the cross-piece E, thence downwardly over a pulley carried by the shaft which supports the adjustable frame B, through an aperture in a bracket G, and around a pulley $e^3$ at the lower end of the adjustable frame, thence upwardly to an apertured lug $g'$ on the bracket G, where it is made fast. The other end of the connection passes from the grooved disk over a pulley $e^4$, carried by the cross-piece E, and from thence through a central aperture in the bracket G to the plate $g$, where it is made fast.

It will be observed by reference to Fig. 3 that the bracket G is rigidly secured to the rectangular frame $c$ and has a projecting flange, through which passes a set-screw $g^2$, bearing upon the upper side of the plate $g$. The plate $g$ carries a set-screw $g^3$, which engages with the under side of the flange on the bracket G. By this construction the plate g can be adjusted to regulate the tension of the flexible connection, one end of which is fastened to the plate g. By the construction shown the object-holder C may be moved upon the frame B by simply turning the crank-arm carried by the shaft F. The worm thereon engaging with the worm-wheel will hold the disk $E^2$, over which the flexible connection passes, locked.

Between the side pieces of the base or main supporting-frame A is journaled a shaft H, which carries a spirally-grooved drum $h$, positioned adjacent to one of the side frames, and said shaft beyond the side frame carries ratchet-wheels $h'$ $h^2$, the teeth of which project in opposite directions and are engaged by pawls pivoted to said ratchets on the side pieces $A'$ $A^2$. A flexible connection is wound or wrapped several times around the drum $h'$, one end thereof being guided over a pulley or roller $h^3$, which is mounted on a support projecting from one of the side pieces of the adjustable frame B. The flexible connection extends from said pulley to the shaft or crossbar, upon which is mounted the pulley $e^2$, the connection with the shaft being made, preferably, by a spring $h^4$. The other end of the flexible connection is attached to the opposite side of the frame B by a similar spring, which engages with a block or plate $h^5$. The springs are of sufficient tension to permit the changing of the position of the frame B by drawing upon one end of the connection and paying out the other end. In adjusting the frame B one of the pawls is disengaged from its ratchet-wheel, and when so disengaged the operator can move the adjustable frame to the desired angle, varying from an upward inclination of the base of the object-holder to a position beyond a vertical one. To lower the frame, one of the pawls is disengaged, and to raise the frame the one on the opposite side of the frame therefrom is disengaged. It will be noted that but a slight manual effort is required to move the frame B, as the camera and its platform will counterbalance the end of the arm carrying the object-holding support.

The shaft upon which the frame B is mounted is journaled in boxes or bearings $A^4$, which enter or lie in boxes $a$, having their upper ends open and provided with vertical slots opposite the shaft-bearing, and on the side pieces of the frame are upwardly-projecting lugs carrying bolts or rods which are encircled by springs which engage with the lugs and projecting portions on the shaft-bearings $A^4$. It will be noted that said shaft-bearings are spring-supported and are susceptible of lateral and vertical movement sufficient to take up any vibration which may be imparted to the frame A, and in order to avoid rigid connections between the base and adjustable frame I employ ropes or flexible connections, as hereinbefore described.

When the camera-platform is adjusted or set so as to be in approximately a horizontal position, the camera should be provided with a hood or closed frame which carries a prism, and the object to be copied is placed on the holder C, said holder being parallel with the camera-platform.

It will be noted that the apparatus hereinbefore described provides a camera-stand upon which the camera and object-support are so mounted that the supporting-frame may be turned to any angle, where it remains fixed without further adjustment and is insulated against vibrations no matter in what positions the same may be placed.

Having thus described my invention, what I claim as new, and desire to secure by Letters Patent, is—

1. In a camera-stand, a base or supporting-frame having spring-sustained boxes or bearings, in combination with an adjustable frame journaled to the boxes or bearings, a camera-platform pivotally attached to the adjustable frame on one side of its supporting means and an object-support longitudinally movable upon the adjustable frame the same being positioned on the other side of the supporting means, for the purpose set forth.

2. In a camera-stand, the combination with a base or supporting-frame having spring-supported bearings or boxes, of a frame held in pivotal engagement with the base and engaging with the bearings or boxes, said frame carrying on one side of its support a longitudinally-adjustable object-support and on the other side a camera-platform which is pivotally attached to the frame, arms movably secured to the camera-platform and studs or pins with which the free ends of the arms may be placed in engagement said pins being carried by the base, substantially as shown and for the purpose set forth.

3. In a camera-stand, the combination with a base, of a frame pivotally connected thereto, an object-support carried by the frame so as to be movable to and from the pivotal connection between the frame and base, a flexible connection the ends of which are attached to the pivotal frame, a shaft carried by the base and provided with a drum over which the flexible connection passes, ratchet-wheels carried by the shaft, and pawls pivoted to the base so as to engage with the ratchet-wheels, substantially as shown and for the purpose set forth.

4. In a camera-stand, the combination with a base having movable shaft-bearings, a shaft carried by an adjustable frame for engagement with said shaft-bearings, and a flexible connection attached to the adjustable frame and engaging with a drum on a shaft journaled in the base, substantially as shown and for the purpose set forth.

5. In a camera-stand, the combination with a base, of a platform carried thereby, and in pivotal connection therewith, the platform having a shaft which engages shaft-bearings, said bearings being spring-supported so as to insulate the platform from the base as to vibrations, for the purpose set forth.

6. In a camera-stand, the combination with a base and a platform or supporting-frame pivotally connected thereto and provided at the points of pivotal connection with means for insulating the parts as to vibrations, of an object-support carried by the platform, and a camera-platform pivotally attached to the supporting-frame, substantially as shown and for the purpose set forth.

7. In a photo-copying camera-stand, the combination with a camera-platform and an object-support carried by an adjustable frame, a base to which said frame is pivotally connected, a shaft carried by the base, a drum mounted on said shaft, a flexible connection attached to the adjustable frame an intermediate portion thereof engaging with the drum, and means for moving the shaft to effect a change of position of the adjustable frame with respect to the base, for the purpose set forth.

8. In a photo-copying camera-stand having a pivotally-supported frame which is insulated from its base, an object-support carried by the frame so as to be adjustable longitudinally thereon, and a camera-platform pivotally attached to said frame and provided with means for changing its position or angle with respect to the object-holder, substantially as shown and for the purpose set forth.

9. In a photo-copying apparatus the combination of a pivotally-supported frame connected to a supporting-base, means embodying flexible connections, guides therefor, a drum over which the flexible connection passes, means for turning said drum attached to the pivotally-supported frame, and an object-support mounted on the pivotally-supported frame the flexible connection engaging with said object-support to effect a longitudinal movement thereof upon the frame when the drum is turned, for the purpose set forth.

10. In a photo-copying apparatus, the combination with a base or main supporting-frame, of a frame pivotally connected thereto and insulated therefrom, means for moving the frame upon its pivot embodying a flexible connection the ends of which are attached to the movable frame, a shaft mounted on the base and provided with a drum about which the flexible connection is wound, and means for holding the shaft against rotation, substantially as shown and for the purpose set forth.

11. In a camera-stand, the combination of a base having spring-supported journal-boxes, a shaft journaled between the side pieces of the base, ratchet-wheels mounted on said shaft, pawls carried by the base, a drum mounted on the shaft between the side pieces of the base, of a frame which engages with the journal-boxes, a flexible connection which is attached thereto and engages with the drum on the shaft hereinbefore mentioned, an object-support and a camera-holder carried by the pivoted frame, substantially as shown so that the angle of the pivoted frame may be varied by disengaging one of the pawls from its ratchet-wheel, for the purpose set forth.

12. In a camera-stand the combination with a base having spring-supported or insulated journal-boxes, a frame having a shaft which engages with said journal-boxes, a shaft journaled to the base and provided with a drum, means for holding said shaft against rotation; together with a flexible connection which passes over the drum the ends thereof being connected to the frame carried by the base, an object-support, and a camera-platform connected to the frame, substantially as shown and for the purpose set forth.

13. In a photo-copying apparatus a camera-platform and an object-support mounted upon a frame, said frame being pivotally connected to and insulated as to vibrations from its supporting-base, means for connecting the camera-platform to the frame so that it may be positioned parallel with or at right angles to the object-support, and means for moving the frame to which the camera-platform and object-support are attached with respect to the base, substantially as shown and for the purpose set forth.

In testimony whereof I affix my signature in presence of two witnesses.

MAX LEVY.

Witnesses:
C. A. HAUSSER,
E. L. WOODWARD.